United States Patent
Lin et al.

(10) Patent No.: US 7,958,521 B2
(45) Date of Patent: Jun. 7, 2011

(54) OPTICAL DISC DRIVE WITH LATCHING MECHANISM THAT FACILITATES DRIVING MECHANISM REPLACEMENT

(75) Inventors: Yen-Hsing Lin, Taipei (TW); Chin-Cheng Lin, Taipei (TW); Ya-Lun Yang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 667 days.

(21) Appl. No.: 11/735,507

(22) Filed: Apr. 16, 2007

(65) Prior Publication Data

US 2008/0059983 A1 Mar. 6, 2008

(30) Foreign Application Priority Data

Aug. 29, 2006 (TW) .............................. 95131699 A

(51) Int. Cl.
*G11B 33/02* (2006.01)
*G11B 33/12* (2006.01)

(52) U.S. Cl. ...................................... 720/657; 720/652

(58) Field of Classification Search .................. 720/652, 720/657, 695–701, 600–616
See application file for complete search history.

(56) References Cited

U.S. PATENT DOCUMENTS
7,565,668 B2 * 7/2009 Guo ............................... 720/652

FOREIGN PATENT DOCUMENTS
CN 1183023 5/1998
CN 1728254 2/2006

OTHER PUBLICATIONS
"1st Office Action of China counterpart application", issued on Apr. 3, 2009, p. 1-p. 4.

* cited by examiner

*Primary Examiner* — Craig A. Renner
*Assistant Examiner* — Gustavo Polo
(74) *Attorney, Agent, or Firm* — Jianq Chyun IP Office

(57) ABSTRACT

There is provided an optical disc drive designed for reading data stored in an optical disc. The optical disc drive includes a body, a driving module, a body wrapping unit, and an access module designed for reading data stored in the optical disc. The driving module and the access module are both disposed in the body. The driving module has a circuit board and a driving element disposed on the circuit board, and the body has a plurality of latching structures. The driving mechanism is secured to the body with the use of the latching structures, and the driving mechanism is secured at one side of the latching structures. Moreover, the body wrapping unit used to cover the body has at least a limiting portion which is positioned at another side of a portion of the latching structures.

9 Claims, 9 Drawing Sheets

OPTICAL DISC DRIVE WITH LATCHING MECHANISM THAT FACILITATES DRIVING MECHANISM REPLACEMENT

CROSS-REFERENCE TO RELATED APPLICATION

This application claims the priority benefit of Taiwan application serial no. 95131699, filed Aug. 29, 2006. All disclosure of the Taiwan application is incorporated herein by reference.

BACKGROUND OF THE INVENTION

1. Field of the Invention

The present invention relates to an electronic apparatus, and in particular to an optical disc drive.

2. Description of Related Art

Optical disc has the advantages of reasonable price, portability, large storage capacity, easy data storage, long storage term, secure storage of data, and so on, so the optical disc has gradually replaced the conventional magnetic storage medium and becomes an indispensable optical storage medium in modern life. With the widespread use of the optical disc, the optical disc drive for reading the data in the optical disc has also become a common electronic product in daily life.

FIG. 1A is a three-dimensional diagram illustrating a conventional optical disc drive. FIG. 1B is a partial explosion diagram illustrating the optical disc drive of FIG. 1A. Referring to FIGS. 1A and 1B together, the conventional optical disc drive 100 comprises a body 110, a driving module 120, a tray 130, and an access module 140. The driving module 120, the tray 130, and the access module 140 are all disposed in the body 110, wherein the driving module 120 comprises a circuit board 122 and a motor 124 welded onto the circuit board 122.

The motor 124 of said driving module 120 is designed for mobilizing the tray 130 and ejecting the same away from the body 110. In addition, a plurality of elastic locking hooks 112 is disposed on the body 110, and the motor 124 can be secured to the body 110 with the use of the elastic locking hooks 112.

Please refer to FIGS. 1C and 1D together for further illustration of the elastic locking hooks 112 and the motor 124. FIG. 1C is a schematic view illustrating the motor in FIG. 1B which is secured to the body. FIG. 1D is a cross-sectional view along line I-I' in FIG. 1C.

As is shown in FIGS. 1C and 1D, in order to effectively secure the motor 124 to the body 110 by applying the elastic locking hooks 112, the prior art discloses a limiting hole 122a corresponding to a plurality of elastic locking hooks 112 disposed on the circuit board 122, and the upper edges of the elastic locking hooks 112 are inserted through the limiting hole 122a on the circuit board 122. Thus, the elastic locking hooks 112 are restricted by the limiting hole 122a so as not to be elastically deformed. That is to say, the elastic locking hooks 112 can effectively secure the motor 124 to the body 110. In other words, the driving module 120 can be firmly disposed in the body 110.

It is noted that when the driving module 120 in the optical disc drive 100 is damaged and needs to be replaced, the maintenance staff cannot easily remove the motor 124 firmly secured with the use of the elastic locking hooks 112. This is because the motor 124 is welded to the circuit board 122, the elastic locking hooks 112 secure the motor 124 to the body 110, and the upper edges of the elastic locking hooks 112 are inserted through the limiting hole 122a on the circuit board 122. Thus, the driving module 120 cannot be directly disassembled from the body 110. In view of the foregoing, the maintenance staff can merely disconnect the circuit board 122 and the motor 124 by means of welding equipment, successively disassembling the circuit board 122 and the motor 124 from the body 110. Thereby, the maintenance of the circuit board 122 and of the motor 124 can be performed. However, given that no welding equipment is available in the maintenance location, the maintenance staff is then unlikely to disconnect the circuit board 122 and the motor 124 welded to each other. The optical disc drive 100 cannot be repaired or maintained accordingly.

SUMMARY OF THE INVENTION

An object of the present invention is to provide an optical disc drive which overcomes the difficulty in disassembling a driving module positioned in the optical disc drive during maintenance.

To achieve the above or other objects, the present invention discloses an optical disc drive designed for reading data stored in an optical disc. The optical disc drive comprises a body, a driving module, a body wrapping unit, and an access module designed for reading data stored in the optical disc. The driving module and the access module are both disposed in the body, wherein the driving module comprises a circuit board and a driving mechanism disposed thereon, and the body comprises a plurality of latching structures. The driving mechanism is secured to the body with the use of the latching structures, and the driving mechanism is secured at one side of the latching structures. Moreover, the body wrapping unit used to cover the body comprises at least a limiting portion which is positioned at another side of a portion of the latching structures, so as to restrict the operation of the latching structures.

In one embodiment of the present invention, said body wrapping unit is a panel.

In one embodiment of the present invention, said limiting portion is a rib.

In one embodiment of the present invention, said body wrapping unit is a cover.

In one embodiment of the present invention, said limiting portion is a protruding structure.

In one embodiment of the present invention, said latching structures are elastic locking hooks.

In one embodiment of the present invention, said driving mechanism is a motor.

In one embodiment of the present invention, said driving mechanism is welded onto the circuit board.

In one embodiment of the present invention, said optical disc drive further comprises a tray disposed in the body and used to hold the optical disc, wherein the driving mechanism is designed for mobilizing the tray and ejecting the same away from the body.

In the optical disc drive of the present invention, a plurality of latching structures is disposed in the body so as to secure the driving mechanism thereto. Wherein, the driving mechanism is secured at one side of the latching structures, while one or a plurality of the limiting portions is positioned at another side of the latching structures on the body wrapping unit. Said limiting portions can prevent the latching structures from being released or deformed by external forces. That is to say, the latching structures can effectively secure the driving mechanism to the body. It is noted that when the driving module is damaged and needs to be replaced, the maintenance staff merely disassembles the body wrapping unit from the body. Namely, to replace the damaged driving module, the maintenance staff simply removes the limiting portion from the side of the latching structures.

In order to the make aforementioned and other objects, features and advantages of the present invention comprehensible, a preferred embodiment accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
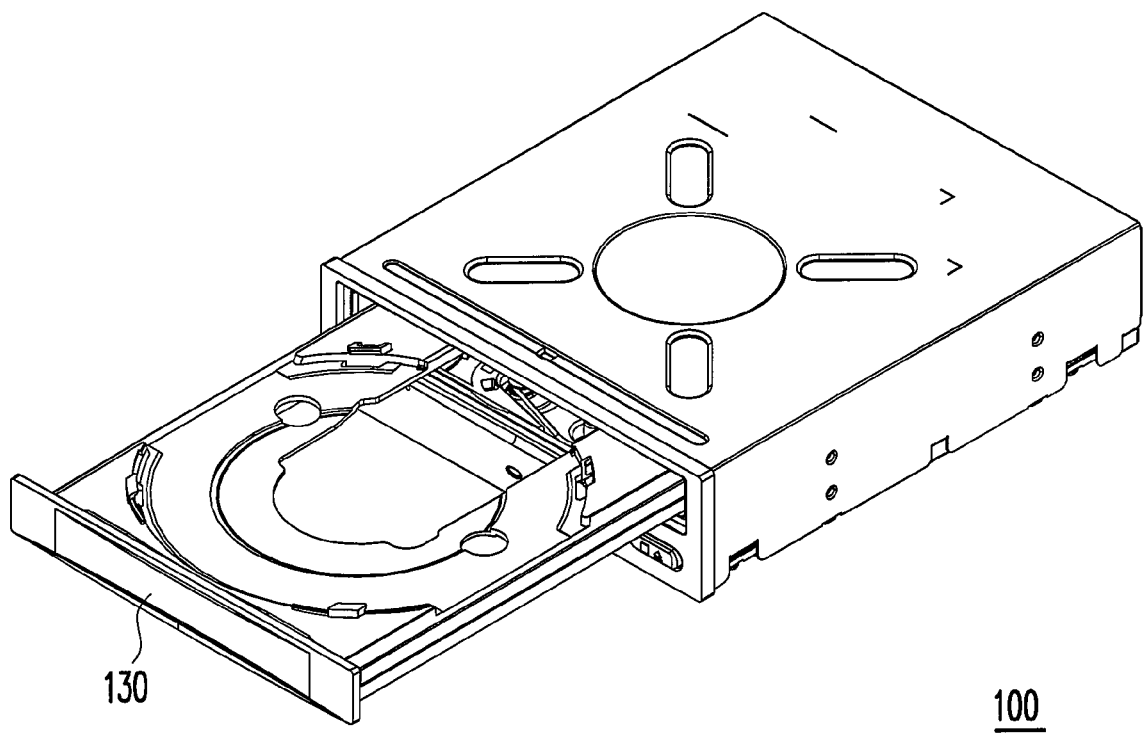
FIG. 1A is a three-dimensional diagram illustrating a conventional optical disc drive.
Figure 1B:
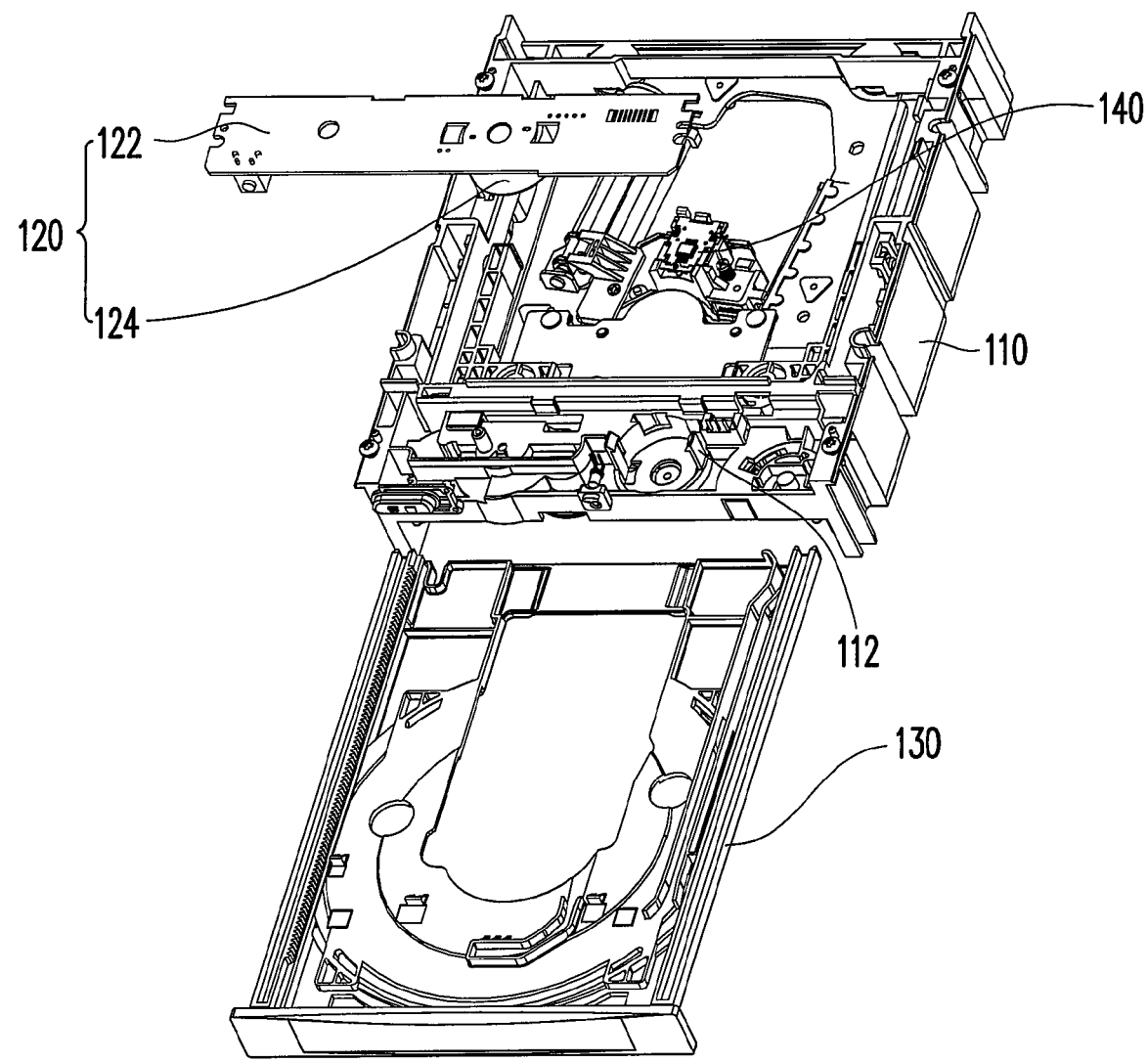
FIG. 1B is a partial explosion diagram illustrating the optical disc drive of FIG. 1A.
Figure 1C:
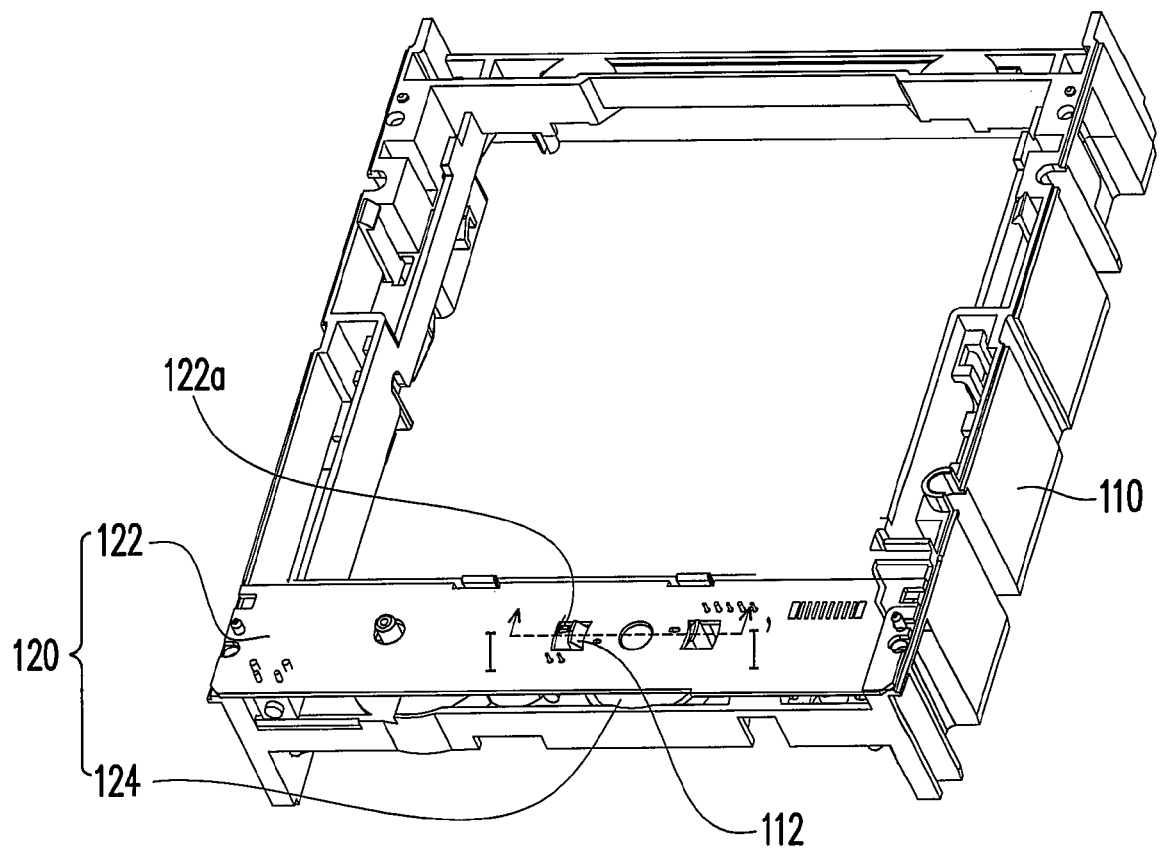
FIG. 1C is a schematic view illustrating the motor of FIG. 1B which is secured to the body.
Figure 1D:
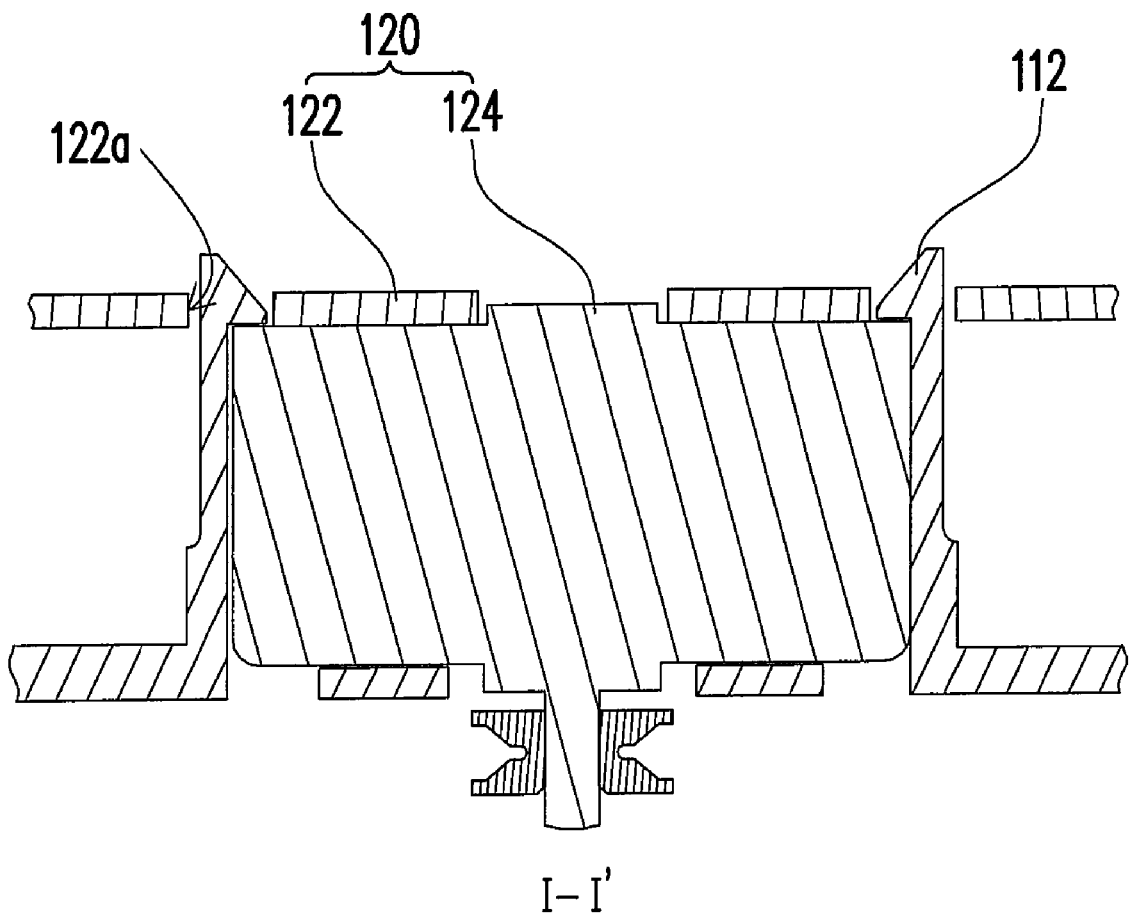
FIG. 1D is a cross-sectional view along line I-I' in FIG. 1C.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
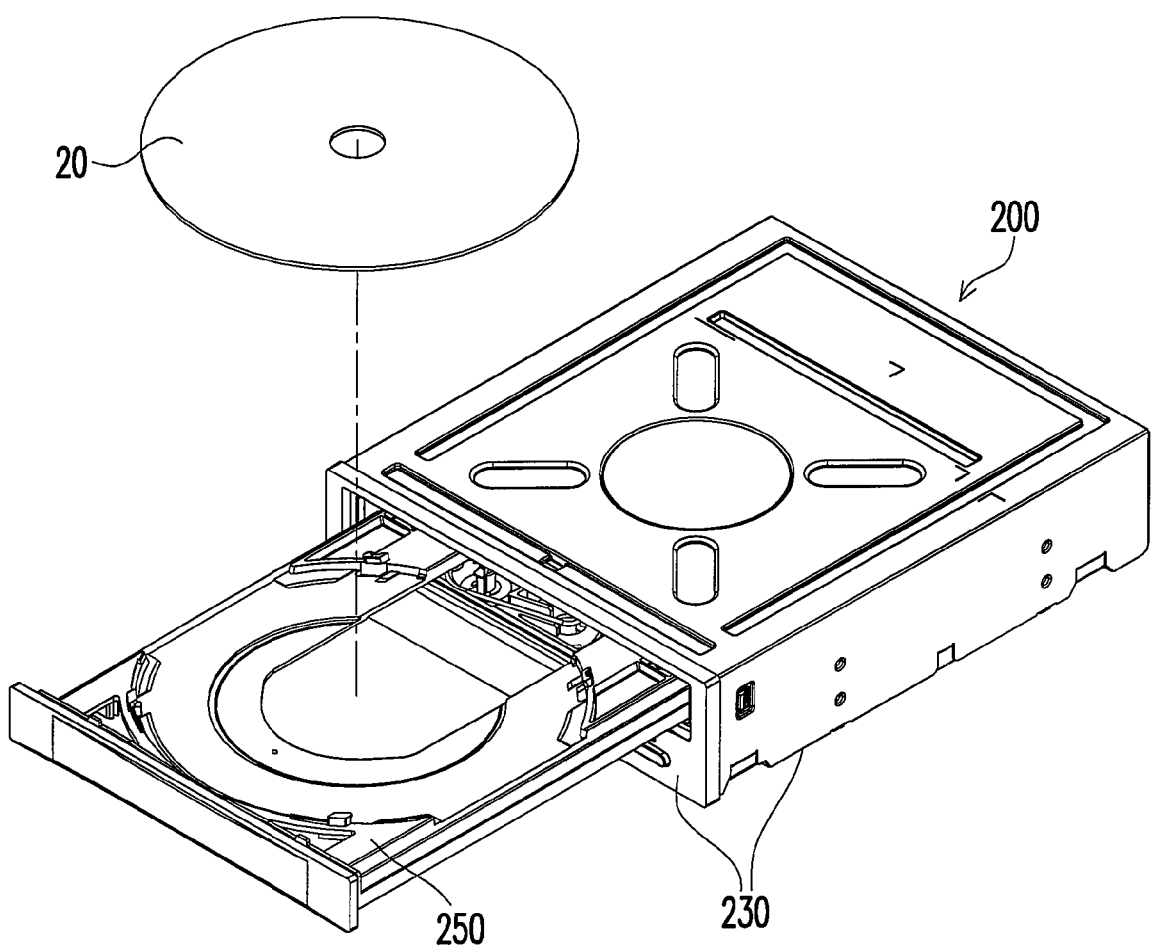
FIG. 2A is a schematic view illustrating an optical disc drive and an optical disc according to one preferred embodiment of the present invention.
Figure 2B:
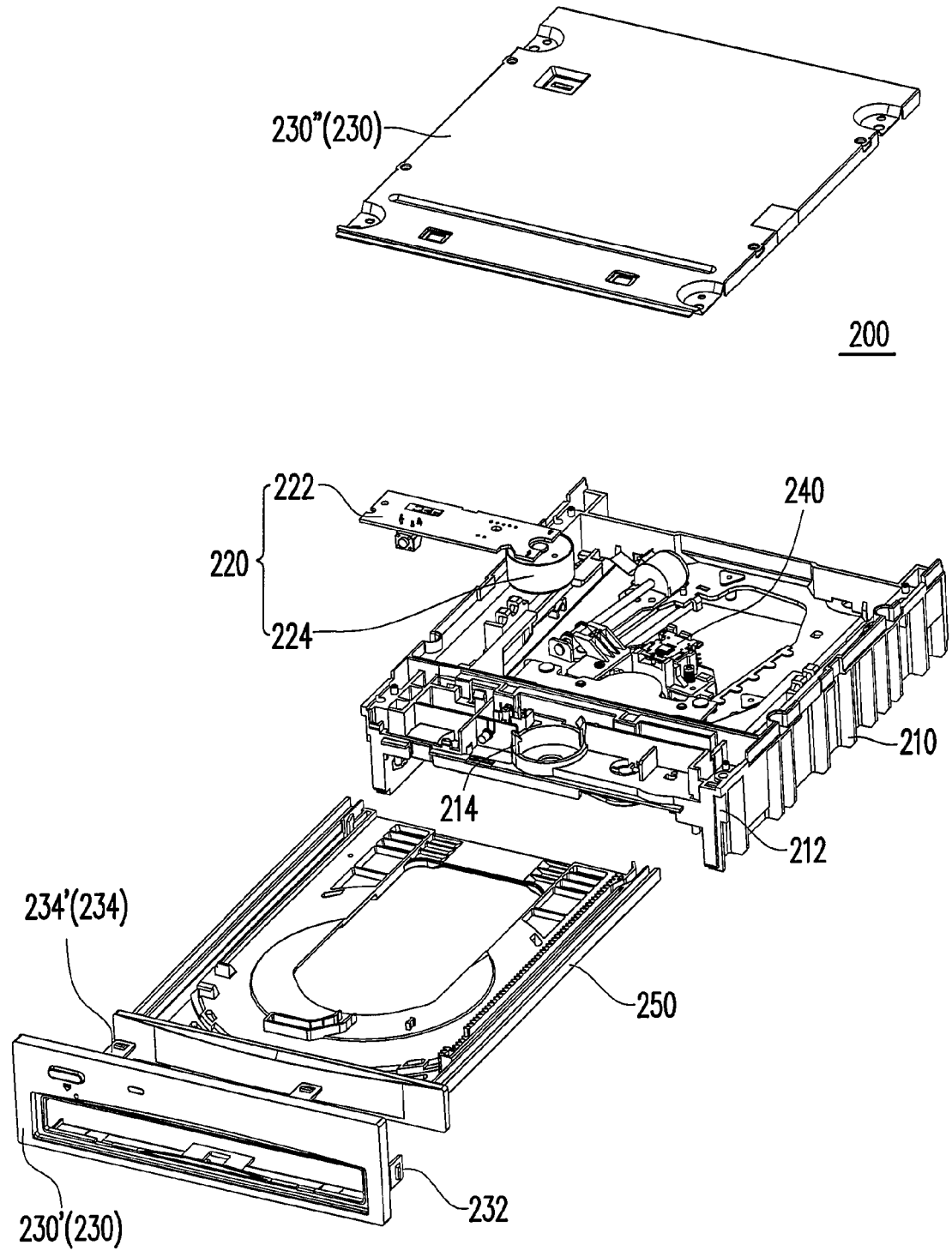
FIG. 2B is a partial explosion diagram illustrating the optical disc drive of FIG. 2A.

FIG. 2A is a schematic view illustrating an optical disc drive and an optical disc according to one preferred embodiment of the present invention. FIG. 2B is a partial explosion diagram illustrating the optical disc drive of FIG. 2A. Referring to FIGS. 2A and 2B together, the optical disc drive 200 of the present embodiment is designed for reading data stored in an optical disc 20. The optical disc drive 200 comprises a body 210, a driving module 220, a body wrapping unit 230, and an access module 240.

In the present embodiment, the driving module 220 and the access module 240 are disposed in the body 210. The body wrapping unit 230 is used to cover the body 210, so as to prevent the electronic devices placed in the body 210 from being damaged by external forces. The access module 240 is designed for reading data stored in the optical disc 20. Note that the body wrapping unit 230 can be a panel 230' of the optical disc drive 200 or a cover 230" thereof in the present embodiment. Furthermore, a locking hook 232 is disposed on the body wrapping unit 230 (panel 230'), and a slot 212 is disposed on the body 210. Thereby, the body wrapping unit 230 is connected to the body 210 through the engagement between the locking hook 232 and the slot 212.

In view of the foregoing, said body 210 comprises a plurality of latching structures 214. As is indicated in FIG. 2B, the body 210 includes two latching structures 214. According to the present embodiment, the latching structures 214 are elastic locking hooks. Said driving module 220 comprises a circuit board 222 and a driving mechanism 224 disposed thereon. According to the present embodiment, the driving mechanism 224 is a motor. Hence, the latching structures 214 can secure the driving mechanism 224 welded to the circuit board 222 to the body 210. In one embodiment, the optical disc drive 200 further comprises a tray 250 disposed in the body 210 and used to hold the optical disc 20. And the driving mechanism 224 not only mobilizes the tray 250 but also ejects/retracts the same away from/toward the body 210, so that users can easily load the optical disc 20.

Figure 3A:
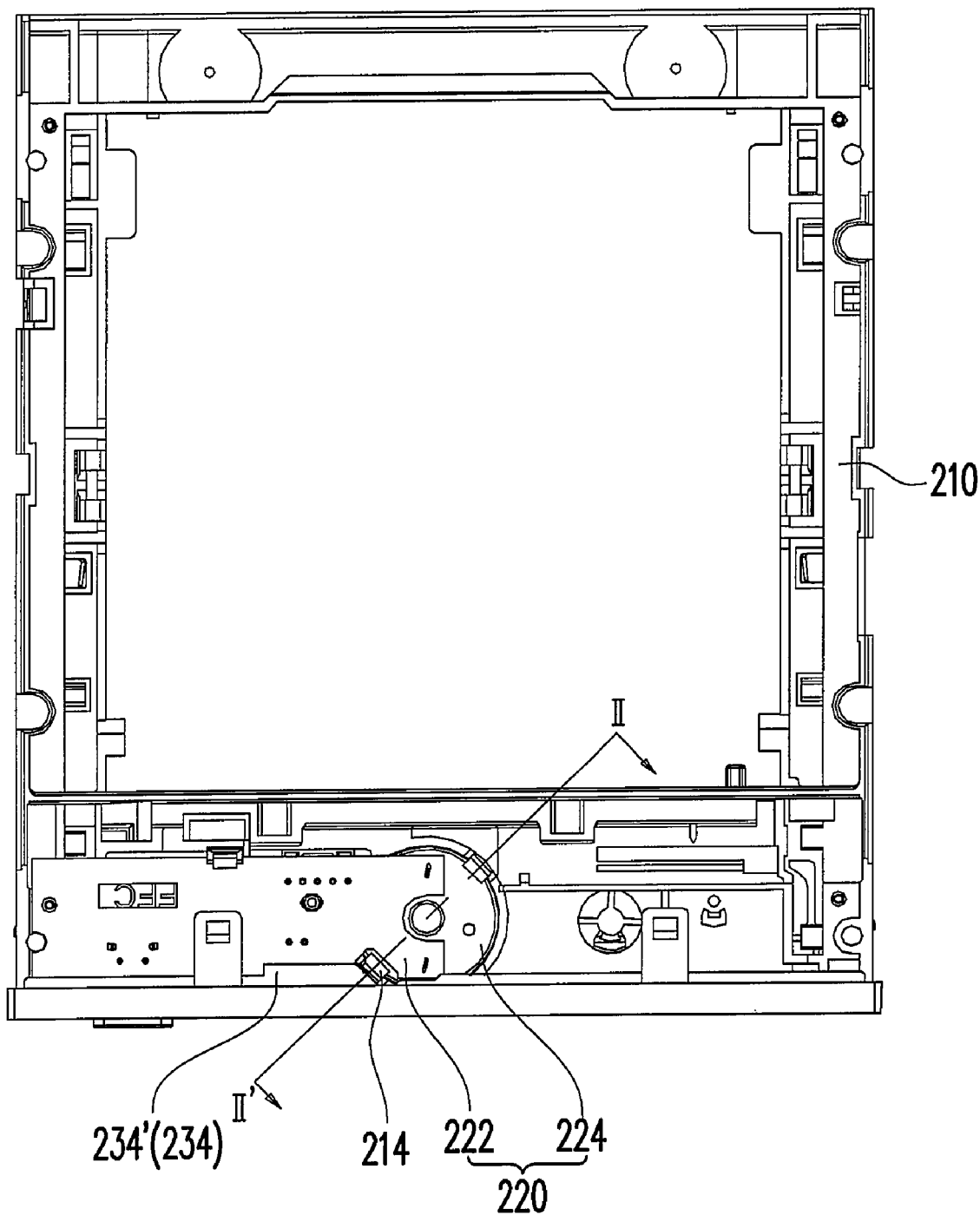
FIG. 3A is a bottom view illustrating the driving module in FIG. 2B and the panel assembled to the body.
Figure 3B:
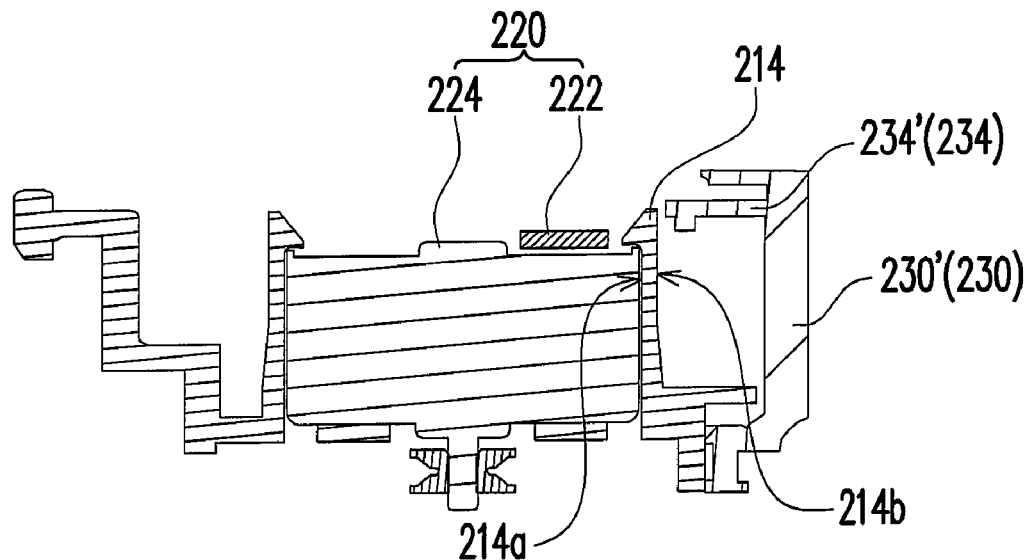
FIG. 3B is a cross-sectional view along line II-II' in FIG. 3A.
Figure 4:
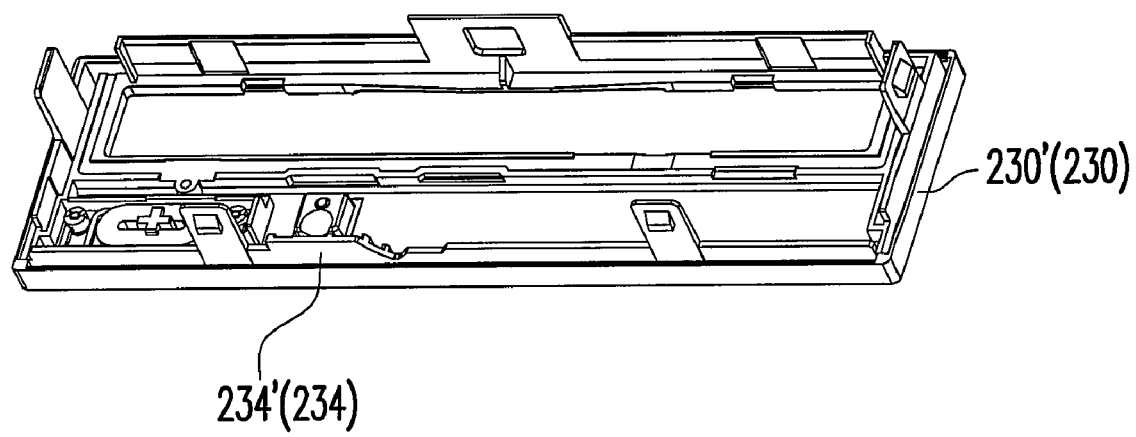
FIG. 4 is a three-dimensional diagram illustrating the panel in FIG. 3A at another viewing angle.

FIG. 3A is a bottom view illustrating the driving module in FIG. 2B and the panel assembled to the body. FIG. 3B is a cross-sectional view along line II-II' in FIG. 3A. And FIG. 4 is a three-dimensional diagram illustrating the panel in FIG. 3A at another viewing angle. Referring to FIGS. 3A, 3B, and 4, the driving mechanism 224 of the present embodiment is secured at a side 214a of the latching structures 214, and one or a plurality of limiting portions 234 (only one is shown in FIG. 3B) are disposed at another side 214b of the latching structures 214 on the body wrapping unit 230. Wherein, the body wrapping unit 230 is, for example, a panel 230' of the optical disc drive 200, and the limiting portion 234 is a rib 234' disposed on the panel 230', for example. According to the present embodiment, the rib 234' on the panel 230' prevents the latching structures 214 from being released or deformed by external forces, so that the driving mechanism 224 secured to the body 210 with the use of the latching structures 214 cannot be removed. In other words, the driving module 220 can be firmly disposed in the body 210.

Figure 5:
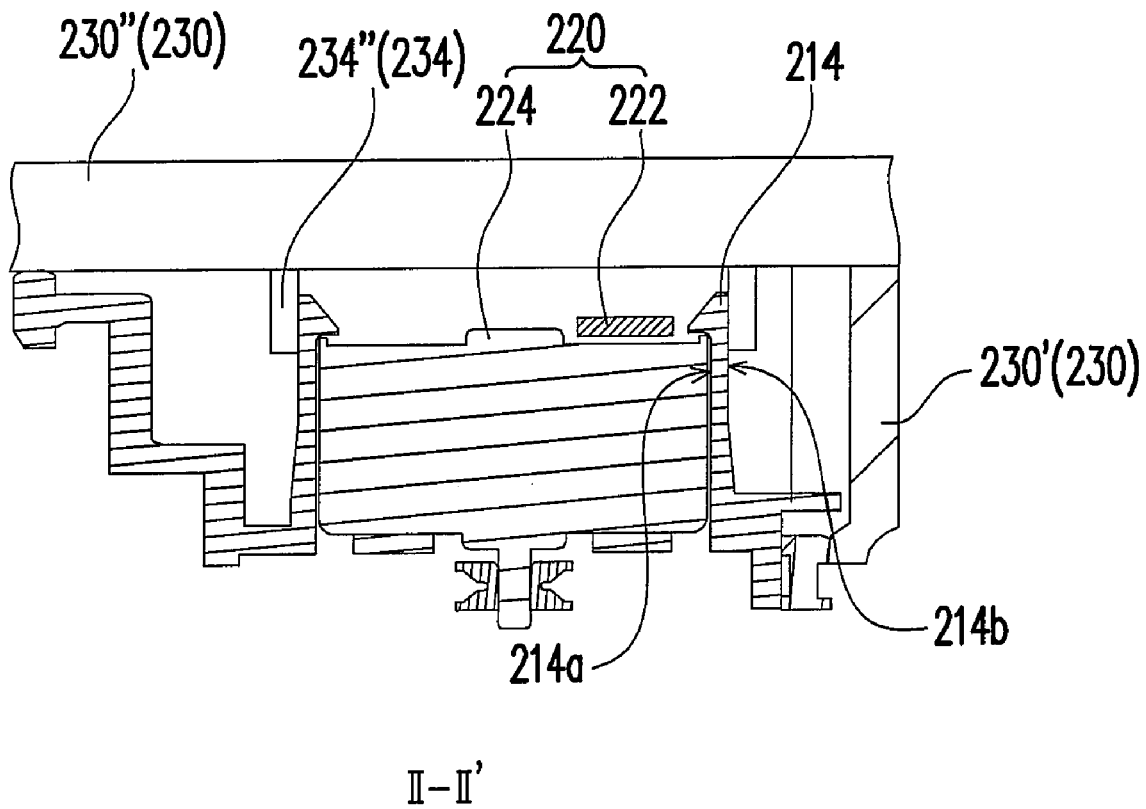
FIG. 5 is a partial cross-sectional view illustrating a cover assembled to the body according to another embodiment of the present invention.

In other preferred embodiments, it is of certainty that the limiting portion 234 may also be disposed on the cover 230" (as is shown in FIG. 2B) so as to prevent the latching structures 214 from being released or deformed. FIG. 5 is a partial cross-sectional view illustrating a cover assembled to the body according to another embodiment of the present invention. In FIG. 5, two protruding structures 234" (the limiting portions 234) respectively corresponding to the latching structures 214 are disposed on the cover 230". The protruding structures 234" are respectively positioned at the sides 214b of the latching structures 214 so as to prevent the latching structures 214 from being released or elastically deformed by external forces. Namely, the driving module 220 of the present embodiment can be firmly disposed in the body 210.

Note that since the body wrapping unit 230 is simply engaged to the body 210, the maintenance staff can easily disassemble the body wrapping unit 230 from the body 210 to replace the driving module 220 when the driving module 220 in the optical disc drive 200 is damaged and needs to be replaced. To be more specific, after the body wrapping unit 230 is disassembled from the body 210, the limiting portions 234 (the ribs 234' or the protruding structures 234") disposed on the body wrapping unit 230 are then removed from the sides 214b of the latching structures 214. Accordingly, the maintenance staff can apply a force to the latching structures 214 so as to elastically deform the latching structures 214 for a short period of time (i.e. the driving mechanism 224 is no longer secured with the use of the latching structures 214). Thereby, the maintenance staff can easily disassemble the damaged driving module 220 from the body 210.

To sum up, according to the optical disc drive disclosed in the preferred embodiments of present invention, a plurality of latching structures is disposed in the body so as to secure the driving mechanism thereto. The driving mechanism is secured at one side of the latching structures, while one or a plurality of the limiting portions on the body wrapping unit is positioned at another side of the latching structures. The limiting portions are capable of preventing the latching structures from being released or elastically deformed, so that the driving mechanism can be firmly disposed in the body. Moreover, since the body wrapping unit is simply engaged to the body, the maintenance staff can easily disassemble the body wrapping unit from the body and remove the limiting portions from one side of the latching structures when the driving module in the optical disc drive is damaged and needs to be replaced. Thereby, the maintenance staff can replace the driving module with ease. Comparing with the prior art, the present invention allows the maintenance staff to manually dissemble the body wrapping unit from the body so as to replace the driving module during maintenance of the optical disc drive. No other processing equipment is then required. Thus, the optical disc drive disclosed in the preferred embodiments of the present invention achieves a better maintenance and advances maintenance efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive designed for reading data stored in an optical disc, comprising:
   a body comprising a plurality of latching structures;
   a driving module disposed in the body, comprising a driving mechanism and a circuit board disposed thereon, wherein the driving mechanism is secured to the body with the plurality of latching structures;
   a body wrapping unit covering the body, comprising at least a limiting portion so as to restrict an operation of at least one of the latching structures, the limiting portion being physically and movably independent from the circuit board of the driving module;
   an access module disposed in the body, wherein the access module is designed for reading data stored in the optical disc.

2. The optical disc drive of claim 1, wherein the body wrapping unit is a panel.

3. The optical disc drive of claim 2, wherein the limiting portion is a rib.

4. The optical disc drive of claim 1, wherein the body wrapping unit is a cover.

5. The optical disc drive of claim 4, wherein the limiting portion is a protruding structure.

6. The optical disc drive of claim 1, wherein the latching structures are elastic locking hooks.

7. The optical disc drive of claim 1, wherein the driving mechanism is a motor.

8. The optical disc drive of claim 1, wherein the driving mechanism is welded onto the circuit board.

9. The optical disc drive of claim 1, further comprising a tray disposed in the body and used to hold the optical disc, wherein the driving mechanism is designed for mobilizing the tray.

* * * * *